(12) United States Patent
Weinberg

(10) Patent No.: US 7,579,038 B1
(45) Date of Patent: Aug. 25, 2009

(54) EDIBLE PET CHEW

(75) Inventor: Christopher A Weinberg, Temecula, CA (US)

(73) Assignee: Waggin' Train, LLC., Anderson, SC (US)

( * ) Notice: Subject to any disclaimer, the term of this patent is extended or adjusted under 35 U.S.C. 154(b) by 704 days.

(21) Appl. No.: 11/144,953

(22) Filed: Jun. 2, 2005

(51) Int. Cl.
*A23J 3/04* (2006.01)
*A23J 3/14* (2006.01)

(52) U.S. Cl. .................. 426/656; 426/657; 426/72; 426/74; 426/104; 426/805

(58) Field of Classification Search ................. 426/656, 426/805, 72, 74, 104, 657
See application file for complete search history.

(56) References Cited

U.S. PATENT DOCUMENTS

| | | | |
|---|---|---|---|
| 5,419,283 A | 5/1995 | Leo | |
| 5,476,069 A | 12/1995 | Axelrod | |
| 5,665,152 A * | 9/1997 | Bassi et al. | 106/145.1 |
| D422,761 S | 4/2000 | Zalevsky | |
| 6,093,441 A | 7/2000 | Axelrod | |
| 6,159,516 A | 12/2000 | Axelrod et al. | |
| 6,202,598 B1 | 3/2001 | Willinger | |
| 6,379,725 B1 | 4/2002 | Wang et al. | |
| 6,455,083 B1 | 9/2002 | Wang | |
| D501,286 S | 2/2005 | Wang | |
| 2004/0197455 A1 * | 10/2004 | Nie et al. | 426/549 |

* cited by examiner

*Primary Examiner*—C. Sayala
(74) *Attorney, Agent, or Firm*—Michael Blaine Brooks, P.C.; Michael B. Brooks

(57) ABSTRACT

The several embodiments of the present invention include methods of producing a thermoplastic, protein-based, edible molded article and the resulting articles. An exemplary method includes the steps of mixing a protein-based thermoplastic composition of the present invention, heating the composition via an extruder, drying the resulting extrudate and heating the dried extrudate and injecting the heated, previously dried, extrudate into one or more molds.

1 Claim, 1 Drawing Sheet

EDIBLE PET CHEW

FIELD OF THE INVENTION

The present invention relates to edible, protein-based pet treats and chewable pet toys. The present invention also relates to methods of preparing such edible, protein-based pet treats and chewable pet toys.

BACKGROUND

Domestic pets, dogs and cats for example, chew as part of their play. A chewable toy or edible pet treat that is nutritious and also promotes good health, particularly good oral hygiene, is highly desirable. Additionally, there is a considerable population of domestic pets that are overweight. Thus, a chewable toy or edible pet treat that provides minimal or little starch when ingested is also desirable.

Conventional manufacturers of protein-based pet chews typically employ horizontal injection molding machines with purchase prices well above one hundred thousand dollars. Furthermore, horizontal injection machines are designed to operate under very high pressures, e.g., 50 to 500 tons per square inch are typical, with large injection quantities, or "shot sizes." These characteristics enable non-pet related manufacturers to use such horizontal injection machines in the manufacture of an array of items, including large articles such as automobile parts, household and garden products. When using such horizontal injection molding machines, pet chew manufacturers typically employ a two-piece mold for their thermoplastic compositions which typically produce up to twelve articles per cycle. The mold for a horizontal injection molding machine is positioned vertically, or perpendicular, to the, typically linear, direction of injection, and accordingly must be bolted into place, due to gravity. After the molten, raw material has been injected into the mold, the machine operator is required to wait for the mold to cool, typically three to five minutes, before opening the mold and releasing the injection-molded articles, so that the mold may again be used. Thus, the entire cycle time of conventional pet chew toy manufacturing via a horizontal injection molding machine is approximately twelve (12) chew toys per six (6) minutes or 120 chew toys per hour. Improvements to this manufacturing process, are desirable and needed to increase the rate of article production, decrease the per article cost and reduce the required capital costs.

Conventional pet chew manufacturers, using horizontal injection molding machines, require the resulting products of extrusion, the extrudate, to be formed into pellets or beads, and to have a moisture content of about 15 to 25 wt. %. These products of extrusion, or extrudate, are then fed into the injection molding machines, with such moisture content, to enable a better flow of the molten material in the injection process. This, however, results in the creation of injection-molded chews or bones with a very high moisture content, which require one to five days of additional drying at a low temperature, to harden. An improved method yielding dried final articles in a shorter period of time also remains desirable and needed. The present invention, in its several embodiments, addresses these needs.

SUMMARY

The embodiments of the presently described invention include methods of producing a thermoplastic, protein-based, edible, molded article. An exemplary method includes the steps of mixing a protein-based thermoplastic composition of the present invention, heating the composition via an extruder, heat drying the resulting extrudate, and injecting the extrudate into one or more molds. An exemplary thermoplastic composition includes or consisting essentially of: from about 45 to 63 percentage by weight (wt. %) protein, wherein the protein comprises a mixture of plant-derived protein from about 45 to 63 wt. % and animal-derived protein from about 0 to 8 wt. %; about 10 to 18 wt. % water; about 0 to 15 wt. % fiber; about 0.5 to 6 wt. % flavoring; about 10 to 25 wt. % edible plasticizer; about 0 to 4.9% wt. % starch; from 0 to about 1 wt. % modifier; from 0 to about 1 wt. % mineral additive; from 0 to about 2 wt. % hygiene additive; and from 0 to about 0.5 wt. % coloring agent.

BRIEF DESCRIPTION OF THE DRAWINGS

The present invention is illustrated by way of example and not limitation in the figures of the accompanying drawings in which.

DETAILED DESCRIPTION

Figure 1:
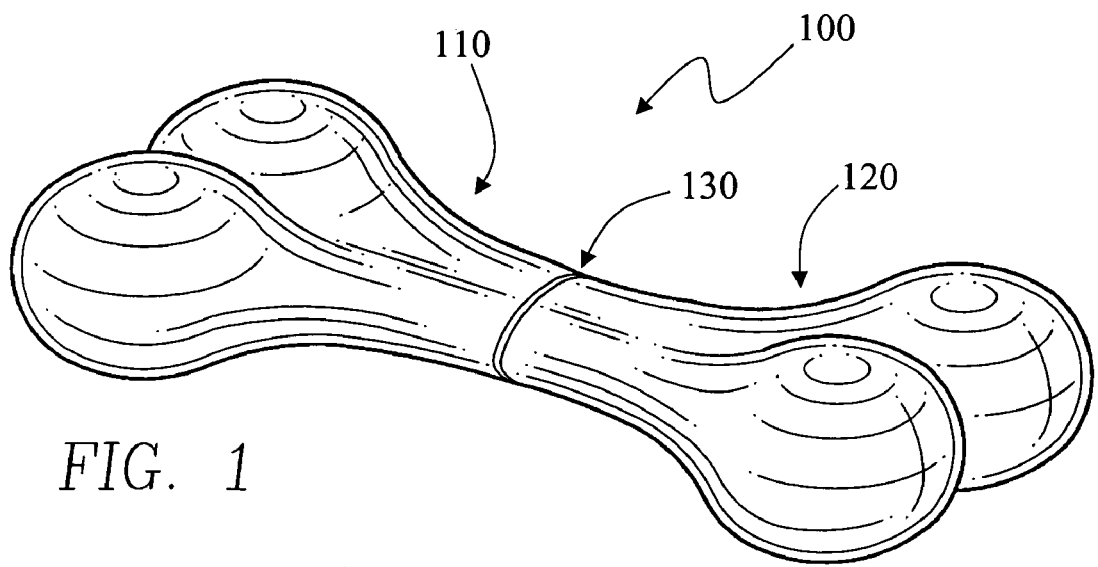
FIG. 1 is a perspective view of an exemplary embodiment of the present invention.

The low starch edible pet chew and methods of manufacture of the present invention in its several embodiments includes an article made of a protein-based thermoplastic composition prepared by combining protein and edible plasticizers and subjecting that composition to heat and pressure in a molding process.

Composition Preparation

During preparation, the composition may include nutrients, reinforcing fibers, additives for pet hygiene, preservatives, water, processing aids, flavorings, and coloring agents. In addition, modifiers such as benzyl sodium may be included in the composition.

The protein-based portion of the exemplary thermoplastic composition is formulated with plant proteins, animal proteins, or preferably a combination thereof amounting to 45 to 63 wt. % of the pre-molded composition. Preferably, the plant protein includes wheat gluten, wheat gluten isolate, rice gluten, or rice gluten isolate. Other plant-derived proteins that are suitable for use in the present composition, either separately, or in combination, include soybean protein that can include soy protein isolate and soy protein concentrate, protein and protein isolates from grains, such as wheat, rye, oats, barley, corn, millet, and sorghum. The plant protein may include other glutens, i.e., oat and rice gluten, and zein, hordein, avenin, kafirin, secalinin, panicin, oryzenin, either separately or in combinations thereof. The protein-based portion of the composition may additionally be formulated with animal protein that preferably is gelatin at about 0 to 8 wt. % of the pre-mold, thermoplastic composition. Other animal proteins that may be added to the composition include casein, albumin, collagen, keratin, natural beef hides, pigskins, and/or chicken skins, either separately or in combination. For all exemplary, pre-mold compositions, the selections of the plant products for the plant-derived protein ingredients are made to include starch from 0 to no more than about 4.9 percent by weight (wt. %). In addition to selecting for low starch content, a multiple rinsing with water of the premixed vegetables or plants selected as sources for the plant-derived protein results in a decreasing of the starch content, if any, as measured by a percentage of weight. Accordingly the selection of plants and vegetable and rinsing of the selected plants and vegetable, both act to drive the resulting starch in the finished, molded articles to less than five percent by weight (wt. %) and preferably less than 2.5 wt %.

The thermoplastic composition preferably includes nutrients such as vitamins and minerals to enhance the nutritional aspect of the articles molded therefrom. Preferred vitamin ingredients for adding to the composition include vitamin A, thiamin ($B_1$), riboflavin ($B_2$), niacin ($B_3$), pyridoxine ($B_6$), folic acid ($B_9$), cyanocobalamin ($B_{12}$), biotin (H), vitamin C, vitamin D, vitamin E, and menadione (vitamin K). Minerals that may be included in major concentrations are calcium (in the form of calcium carbonate), potassium, magnesium, and sodium. Minerals that may be included in trace concentrations are iron, phosphorus, zinc, manganese, iodine, selenium, and cobalt. Reinforcing fibers may be used in the protein-based compositions of the present invention and may include rawhide, pork skin fiber and preferably marine kelp at about 0 to 15 wt. % marine kelp. Also, reinforcing fibers may be used in the compositions of the present invention and may include rawhide and preferably pork skin fiber.

Additives for maintaining or improving the oral hygiene of the pet may be included in the thermoplastic compositions of the present invention. Exemplary hygienic additives that may be included to promote healthy teeth and gums and a breath pleasing to the pet's human companion are anti-tartar agents and breath-fresheners. One or more hygienic additives acting as anti-tartar agents may be selected for inclusion in the thermoplastic composition from a group of cleaning abrasives, included to help clean the surfaces of the pet's teeth during mastication of the chew article of the present invention, where the group includes calcium pyrophosphate, sodium tripolyphosphate, zinc citrate, and calcium hydrogen phosphate. Preferably chlorophyll is selected as a hygienic additive acting as breath-freshener for inclusion in the thermoplastic composition and one or more additional hygienic additives such as dementholized peppermint oil, spearmint oil, sorbitol, and sorbitan, for example, may also be selected for inclusion as breath-fresheners.

Preservatives to maintain freshness of the post-molded composition may also be included in the thermoplastic composition prior to molding. Preservatives that may be added, separately or in combination, to the thermoplastic composition include ibutylated hydroxy anisole (BHA), butylated hydroxy toluene (BHT), ethoxyquin (6-ethoxy-1,2-dihydro-2,2,4-trimethylquinoline), and vitamins C and E, as described above. In addition, bactericides may be included in the thermoplastic composition as preservatives and one or more may be included such as calcium propionate, sorbic acid, potassium sorbate, lactic acid, benzoic acid, sodium benzoate, ethyl-p-hydroxybenzoate, and propyl-p-hydroxybenzoate.

In order to maintain processing flowability of the thermoplastic composition, water and edible plasticizers are preferably included in the composition. The water content of the thermoplastic composition is preferably about 10 to 18 wt. %. The percentage of weight of water is reduced during processing, molding and drying of the article. The final molded and dried article preferably has from 8 to 14 wt. % water. Edible plasticizers are preferably included with a range of about 10 to 25 wt. %, and are preferably included in the thermoplastic composition with glycerol (glycerin) from about 10 to 22 wt. % and propylene glycol from about 0 to 3 wt. %. Other edible plasticizers which may be also included in the thermoplastic composition include sorbitan, ethylene glycol, diethylene glycol, dipropylene glycol, mannitol, and sorbitol.

Flavorings are preferably included in the thermoplastic compositions to provide a flavor and odor which attracts and entices the pet. Where the flavorings are oils, their inclusion may be helpful in maintaining healthy skin and coat. The flavoring ingredients, at about 0.5 to 6 wt. %, are preferably distributed throughout the molding composition so that the attractive odor and/or flavor remain throughout the useful life of the chewable pet toy or artificial dog bone. Typical flavorings that may be added to the thermoplastic composition include plant and animal flavors such as garlic powder, salt, onion powder, plant oils, such as corn oil and peanut oil, and natural animal meat and animal products, such as beef hide, pork skin, chicken meat and fat, beef meat and fat, pork meat and fat, and dried meat floss, animal-derived oils, animal organs and animal organ concentrates. The preferred flavorings are chicken liver concentrate from about 0 to 4 wt. %, chicken oil at 0 to 1 wt. %, and vegetable oil at 0 to 1 wt. %. Modifiers may be added to the thermoplastic composition to enhance the mechanical properties of the composition particularly a resistance to separation of the portions 110,120 of the article brought about by stress and strain of the formed or molded article 100 about the notch 130. In addition, modifiers may be added to the thermoplastic composition to improve the physical properties and processing properties of the composition so that the heated composition under pressure can be readily formed in molds. Typical modifiers which may be added to the thermoplastic composition include benzyl sodium, pectin, carrageenan, carob gum, agar, mannan, and sodium alginate.

Exemplary thermoplastic compositions of the present invention, i.e., Examples 1-6, are tabularized in Tables 1 and 2.

TABLE 1

| Ingredients (%-age by weight) | Example 1 | Sub-Total | Example 2 | Sub-Total | Example 3 | Sub-Total |
|---|---|---|---|---|---|---|
| Protein | | 62.5 | | 58.5 | | 52.5 |
| Soy Protein Isolate | 36.5 | | 15.0 | | 11.5 | |
| Wheat Gluten | 20.0 | | 37.5 | | 35.0 | |
| Gelatin | 6.0 | | 6.0 | | 6.0 | |
| Water | | 12.0 | | 12.0 | | 12.0 |
| Flavoring | | 4.5 | | 3.5 | | 2.5 |
| Chicken Liver Concentrate | 3.5 | | 2.5 | | 1.5 | |
| Vegetable Oil | 0.5 | | 0.5 | | 0.0 | |
| Chicken Oil | 0.5 | | 0.5 | | 1.0 | |
| Edible Plasticizer | | 20.0 | | 20.0 | | 20.0 |
| Glycerin | 18.0 | | 15.0 | | 10.0 | |
| Propylene Glycol | 2.0 | | 5.0 | | 10.0 | |
| Fiber Reinforcement (e.g., Marine Kelp) | 0.0 | 0.0 | 5.0 | 5.0 | 12.0 | 12.0 |
| Modifier | | 0.0 | | 0.0 | | 0.0 |
| Benzyl Sodium | * | | * | | * | |
| Additives | | 1.0 | | 1.0 | | 1.0 |
| Calcium Carbonate | 0.5 | | 0.5 | | 0.5 | |
| Chlorophyll | 0.4 | | 0.5 | | 0.4 | |
| Coloring Agent | 0.1 | | 0.0 | | 0.1 | |

* trace amounts

TABLE 2

| Ingredients (%-age by weight) | Example 4 Sub-Total | Example 5 Sub-Total | Example 6 Sub-Total |
|---|---|---|---|
| Protein | 45.0 | 57.0 | 59.5 |
| Soy Protein Isolate | 11.0 | 14.0 | 13.5 |
| Wheat Gluten | 34.0 | 37.0 | 37.0 |
| Gelatin | 0.0 | 6.0 | 8.0 |
| Water | 18.0 | 10.0 | 12.0 |
| Flavoring | 6.0 | 0.5 | 2.5 |
| Chicken Liver Concentrate | 4.5 | 0.5 | 1.5 |
| Vegetable Oil | 1.0 | 0.0 | 0.0 |
| Chicken Oil | 1.0 | 0.0 | 1.0 |
| Edible Plasticizer | 25.0 | 20.0 | 10.0 |
| Glycerin | 22.0 | 15.0 | 8.0 |
| Propylene Glycol | 3.0 | 5.0 | 2.0 |
| Fiber Reinforcement | 2.5 | 12.0 | 15.0 |
| (e.g., Marine Kelp) | 2.5 | 12.0 | 12.0 |
| Modifier | 0.0 | 0.0 | 0.0 |
| Benzyl Sodium | * | * | * |
| Additives | 3.5 | 0.5 | 1.0 |
| Calcium Carbonate | 1.0 | 0.0 | 0.5 |
| Chlorophyll | 2.0 | 0.0 | 0.4 |
| Coloring Agent | 0.5 | 0.5 | 0.1 |

* trace amounts

Making Articles from the Prepared Composition

The method of making the articles from the thermoplastic composition of the present invention includes mixing, extruding, drying, and injection-molding the thermoplastic composition. The several embodiments of the thermoplastic composition of the present invention are preferably formed into articles by injection molding and may also be formed via extrusion molding, transfer molding, and compression molding.

In preparing for the molding of the thermoplastic molding composition according to the several embodiments of the present invention, the ingredients are preferably mixed uniformly to preferably form a substantially homogeneous composition. Ribbon blenders may be employed to evenly mix the ingredients of the composition. The mixing may also be effected by agitated blenders and high-speed mixers.

The mixed composition is preferably next fed into an extrusion machine or extruder to produce the extruded, mixed composition as an extrudate that may be cut into pellets, also termed pelletized. During the extrusion process, the mixed composition is heated to a temperature of from about 60 to 80 degrees Celsius (60-80° C.) and preferably maintained at a temperature of about sixty degrees Celsius (60° C.), while extruded by, for example, an extruder that is an auger screw device having a diameter of eight (8) to ten (10) centimeters, and preferably about nine (9) centimeters. The extruder provides additional mixing of the composition and places the mixed composition under pressure, preferably with a pressing force tonnage of approximately 15-20 tons for a typical extruder. The extrudate exits the extruder through preferably a plurality of circular holes within a pellet die where the holes are of three millimeter (3 mm) diameter and thereafter may be pelletized. For pelletizing the extrudate, there may be attached or proximate, to the end of the die, a cutting blade, preferably having a cutting periodicity adjusted to the extruder outflow so that the blade cuts the extrudate into pellets, preferably 3 to 5 mm in length. The pellets of this phase of the manufacturing process preferably have a moisture content of approximately 16 to 18 percent by weight. The processing conditions may be varied as necessary to achieve suitable mixing and substantially homogeneous pellets. One of ordinary skill in the art will recognize that: (a) the type of extruder; (b) the temperature distributions of the extrudate and of the mixed composition under pressure along the extruder; (c) the pressing force and the resulting pressure; (d) the number of screws, screw speed and configuration of the screws; (e) the feed rate of the ingredients; and (f) the throughput rate may all be varied according to particular embodiments and yet with the variations, the embodiments remains be within the scope of the invention.

Next, the newly cut pellets, or other portions of the extrudate, are preferably dried to reduce their moisture content prior to injection molding. The dehydrating step may be accomplished, for example, by tumble drying the newly cut pellets. That is, the newly cut pellets may be placed into a barrel or drum, preferably a stainless steel barrel, that is heated along with the volume of air within it and the barrel is concurrently rotated. Preferably, the pellets are subjected to an environmental, typically air, temperature within the rotating barrel of about 60 to 70 degrees Celsius (60-70° C.) for a period of about four to five hours. The pellets are preferably dried to a moisture content of 8 to 11 percent by weight of the pellets prior to the injection molding process. The mixed composition of the several embodiments of the present invention as pellitized extrudate exit the drying of the pellets phase according to the present invention as nutritious articles that are readily injection-moldable.

Figure 2:
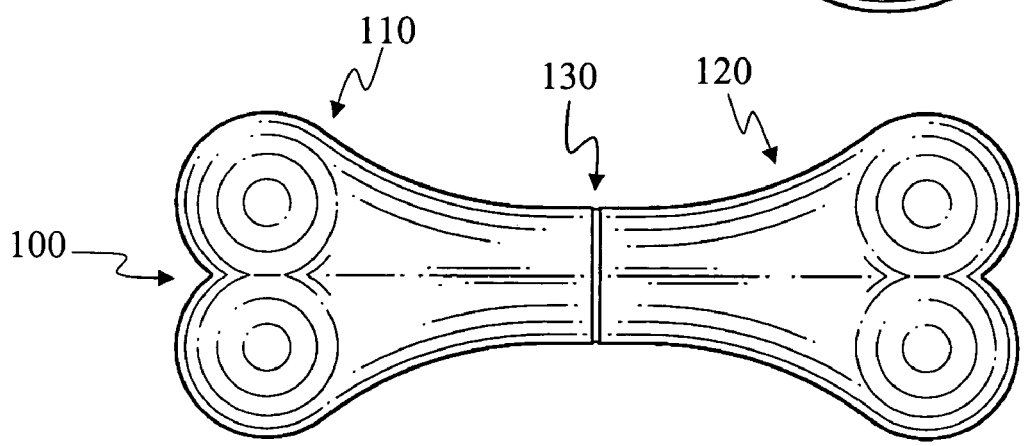
FIG. 2 is a top or plan view of the exemplary embodiment of the present invention.
Figure 3:
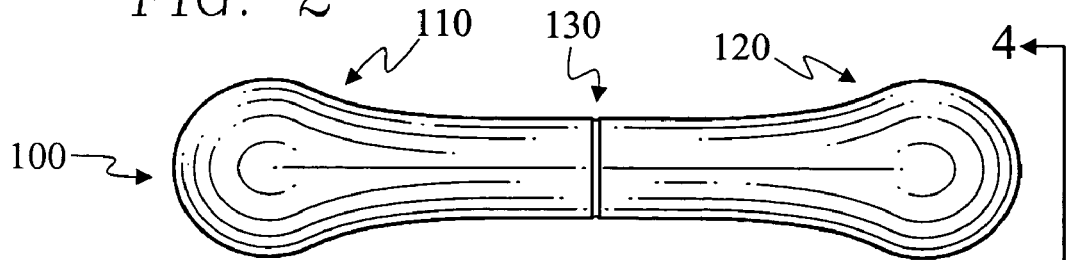
FIG. 3 is a side view of the exemplary embodiment of the present invention.
Figure 4:
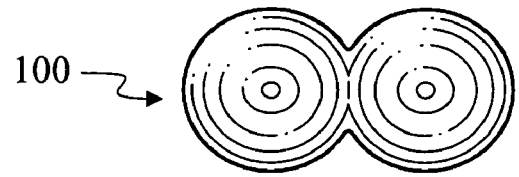
FIG. 4 is an end view of the exemplary embodiment of the present invention.

Preferably, injection molding is used to form the molded articles from the dried pellets. When horizontally oriented injection molding devices are used, typically the molds used are presented in a vertical orientation for receiving the injected material and the molds are also typically bi-valve requiring bolt fasteners that affix the mold halves to the injection devices and requiring hydraulic pistons that hold the two halves of the mold together to maintain the mold integrity during material injection. Preferably vertically oriented injection molding devices are used where the molds may be presented in a horizontal orientation for receiving the injected material whereby the fasteners are typically integrated into the mold without the need for bolt fasteners affixed to the injection device and without the need for hydraulic pistons to maintain mold integrity during material injection. The absence of mold fasteners enables the vertically-oriented injection molding device operator to readily swap molds and typically provides a shortened manufacturing cycle and produces more molded articles than the typically more costly horizontally oriented injection molding devices. The resulting molded articles are exemplified in FIGS. 1-4 as pet chews in the form of a bone caricature. FIG. 1 is a perspective view of an exemplary embodiment of the present invention 100 illustrating a first portion 110, a second portion 120 and a mid-portion having a circumferential notch. The notch 130 circumscribes and provides a breaking plane by which, with the application of strain, the first portion 110 may be separated from the second portion 120. FIG. 2 is a top or plan view of the exemplary embodiment of the present invention 100. FIG. 3 is a side view of the exemplary embodiment of the present invention 100. FIG. 4 is an end view of the exemplary embodiment of the present invention 100. It is understood by those of ordinary skill in the art that the selected molding process, such as injection molding of the compositions of the present invention may yield various articles having other shapes and sizes.

When a vertical injection molding machine is used to mold the articles, the pellets are preferably placed in a gravity hopper positioned at the top of the machine. Preferably, the injection molding machine is calibrated or set to release the preferred amount or shot size of pellets into the barrel of the injection molding machine. For example, the preferred shot size is approximately 240 grams of pellets in the molding of four 60-gram articles of an exemplary embodiment as individually illustrated by FIGS. 1, 2, 3 and 4.

The preferred vertical injection molding machine has a barrel within which a hydraulic piston or auger type screw may operate to inject the molten composition into molds. The operating temperature of the barrel may be heated to a range of from 120 to 180 degrees Celsius (120-180° C.) and is preferably at about 130 degrees centigrade (130° C.).

Typically, vertical injection molding machines are five to twenty times less expensive than horizontal injection molding machines. The pressing force applied in a vertical injection machine of a class appropriate for the forming of pet chews having compositions of the present invention is typically from 15 to 20 tons with a maximum shot size capacity of 500 grams. This capacity is sufficient for producing, for example, the four (4) 60-gram pet chew articles per cycle. Thus, the preferred process of the present invention has a production capacity which may be four times more than that of horizontal injection molding process.

Upon releasing the shot, or injectable mass, from a top-feed hopper into the heated vertical barrel, the vertical barrel is heated causing the injectable mass to become a molten mass having a temperature in a range from about 80 to 125 degrees Celsius (80-125° C.). A hydraulic piston or auger-type screw pushes the molten pellets down through the barrel, where the molten mass exits through a preferably 5 mm nipple and into the horizontally-positioned mold, and more generally the mold being substantially perpendicular to the direction of the piston motion. The mold is heated to a range of from about 120 to 180 degrees Celsius (120-180° C.) and preferably to about 130 degrees Celsius (130° C.) and is adapted to be cooled in the post-injection phase via a chiller preferably separate from the vertical injection molding machine. Typically, the entire cycle time for each shot, from barrel filling with pellets to completing the injection of the melted pellets into the mold is approximately thirty seconds. After the mold is filled, the mold is removed from the injection machine and placed into a free standing chiller system, which cools the mold and the articles, e.g. formed pet chew, inside. For example, the mold may be chilled by the molds being preferably inserted into a cooling medium to bring the mold and the molded articles within to a temperature of from about 0 degrees Celsius to about 20 degrees Celsius (0-20° C.) over a period of about five to ten minutes and therafter the mold may be opened and the molded articles removed. Preferably contemporaneously with the cooling step, another empty mold is placed horizontally into the injection molding machine and the process is repeated, again preferably every thirty seconds. Thus, the entire exemplary cycle time of manufacturing via a vertical injection molding machine is approximately four chews per thirty seconds or 480 chew toys per hour.

Composition of the Formed Articles

Once removed from the molds, the composition of the formed articles typically differs from the mixed compositions largely due to moisture loss. Preferably, the molded articles produced according to the methods herein described have a starch content of approximately less than 2.5 wt. %.

A method of manufacturing an improved animal chew or biodegradable article is described above along with its composition and resulting articles. In doing so, it must be understood that the illustrated preferred and alternative embodiments above in the foregoing description of the preferred embodiment of the invention and best mode for practicing the invention are all provided for the purpose of illustration and not for the purpose of limitation and have been set forth only for the purposes of example and should not be taken as limiting the invention as defined by the following claims. Various details of the invention may be changed without departing from its scope. That is, many alterations and modifications may be made by those having ordinary skill in the art without departing from the spirit and scope of the invention. The words used in this specification to describe the invention in its several embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

What is claimed is:

1. A method of producing a thermoplastic, protein-based, edible injection-molded article, the method comprising the steps of:

mixing a thermoplastic composition comprising:
from about 45 to 63 wt. % protein, wherein the protein comprises a mixture of plant-derived protein from about 45 to 63 wt. %, from plants yielding less than about 4.9 wt. % starch to the thermoplastic composition, and animal-derived protein from about 0 to 8 wt. %;
about 10 to about 18 wt. % water;
about 0.5 to about 6 wt. % flavoring;
about 10 to about 25 wt. % edible plasticizer;
from 0 to about 15 wt. % fiber reinforcement;
from 0 to about 1 wt. % modifier;
from 0 to about 1 wt. % mineral additive;
from 0 to about 2 wt. % hygiene additive; and
from 0 to about 0.5 wt. % coloring agent;
introducing and heating the mixed composition via an extruder to yield an extrudate;
drying the extrudate until the extrudate has a moisture content of from about 8 to about 11 wt. %; and
introducing the dried extrudate, via a heated vertical injection molding machine, into horizontally-oriented molds having cooling jackets.

\* \* \* \* \*